US011785609B2

(12) United States Patent
Zhou et al.

(10) Patent No.: US 11,785,609 B2
(45) Date of Patent: Oct. 10, 2023

(54) TECHNIQUES FOR INDICATING LACK OF DATA FOR TRANSMISSION

(71) Applicant: QUALCOMM Incorporated, San Diego, CA (US)

(72) Inventors: Yan Zhou, San Diego, CA (US); Tao Luo, San Diego, CA (US); Sony Akkarakaran, Poway, CA (US); Konstantinos Dimou, San Francisco, CA (US); Seyed Ali Akbar Fakoorian, San Diego, CA (US); Mostafa Khoshnevisan, San Diego, CA (US); Kazuki Takeda, Tokyo (JP); Hamed Pezeshki, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/911,072

(22) Filed: Jun. 24, 2020

(65) Prior Publication Data
US 2020/0413434 A1     Dec. 31, 2020

Related U.S. Application Data

(60) Provisional application No. 62/868,473, filed on Jun. 28, 2019.

(51) Int. Cl.
*H04W 72/02*     (2009.01)
*H04W 72/23*     (2023.01)
(Continued)

(52) U.S. Cl.
CPC ........... *H04W 72/23* (2023.01); *H04W 16/14* (2013.01); *H04W 28/0278* (2013.01);
(Continued)

(58) Field of Classification Search
CPC . H04W 72/14; H04W 72/0413; H04W 16/14; H04W 80/02; H04W 28/0278;
(Continued)

(56) References Cited

U.S. PATENT DOCUMENTS 8,873,481 B2    10/2014   Kim et al.
2011/0205991 A1*   8/2011   Kim ................... H04W 72/1289
                                                                     370/329
(Continued)

FOREIGN PATENT DOCUMENTS

EP          3133888 A1 *    2/2017           H04L 1/1671
EP          3133888 A1      2/2017
(Continued)

OTHER PUBLICATIONS

U.S. Appl. No. 62/825,301, filed Mar. 2019.*
International Search Report and Written Opinion—PCT/US2020/039666—ISA/EPO—Sep. 3, 2020.

*Primary Examiner* — Lakeram Jangbahadur
(74) *Attorney, Agent, or Firm* — QUALCOMM Incorporated

(57) ABSTRACT

A user equipment (UE) may be provisioned with multiple scheduling configurations and/or configured grants (CGs). Aspects of the present disclosure provide techniques for transmitting an indication from the UE to the base station indicating that the UE has no data to be transmitted to the BS during the allocated transmission time interval in order to prevent base station from allocating resources for transmission.

25 Claims, 8 Drawing Sheets

(51) Int. Cl.
  *H04W 16/14* (2009.01)
  *H04W 80/02* (2009.01)
  *H04W 28/02* (2009.01)
  *H04W 52/36* (2009.01)
  *H04W 72/21* (2023.01)

(52) U.S. Cl.
  CPC ......... *H04W 52/365* (2013.01); *H04W 72/02* (2013.01); *H04W 72/21* (2023.01); *H04W 80/02* (2013.01)

(58) Field of Classification Search
  CPC ............... H04W 52/365; H04W 72/02; H04W 72/1284; H04W 16/10; H04W 16/12; H04W 72/1257; H04W 72/0453; H04W 72/0446; H04B 17/318
  See application file for complete search history.

(56) References Cited

U.S. PATENT DOCUMENTS

| | | | |
|---|---|---|---|
| 2012/0127901 A1* | 5/2012 | Hole | H04W 52/0229 370/329 |
| 2018/0368081 A1* | 12/2018 | Akkarakaran | H04W 52/42 |
| 2019/0124688 A1* | 4/2019 | Golitschek Edler von Elbwart | H04L 1/1835 |
| 2019/0380148 A1* | 12/2019 | Dudda | H04W 72/12 |
| 2020/0053793 A1* | 2/2020 | Loehr | H04L 5/0055 |
| 2020/0053820 A1* | 2/2020 | Chin | H04W 72/1242 |
| 2020/0314860 A1* | 10/2020 | Zhou | H04W 72/14 |
| 2020/0351931 A1* | 11/2020 | Babaei | H04W 76/27 |

FOREIGN PATENT DOCUMENTS

| | | | | |
|---|---|---|---|---|
| WO | 2012022369 A1 | | 2/2012 | |
| WO | WO-2012022369 A1 | * | 2/2012 | ............ H04W 8/24 |
| WO | 2017172165 A1 | | 10/2017 | |
| WO | WO-2017172165 A1 | * | 10/2017 | |
| WO | 2018162059 A1 | | 9/2018 | |
| WO | WO-2018162059 A1 | * | 9/2018 | ............ H04W 74/02 |

* cited by examiner

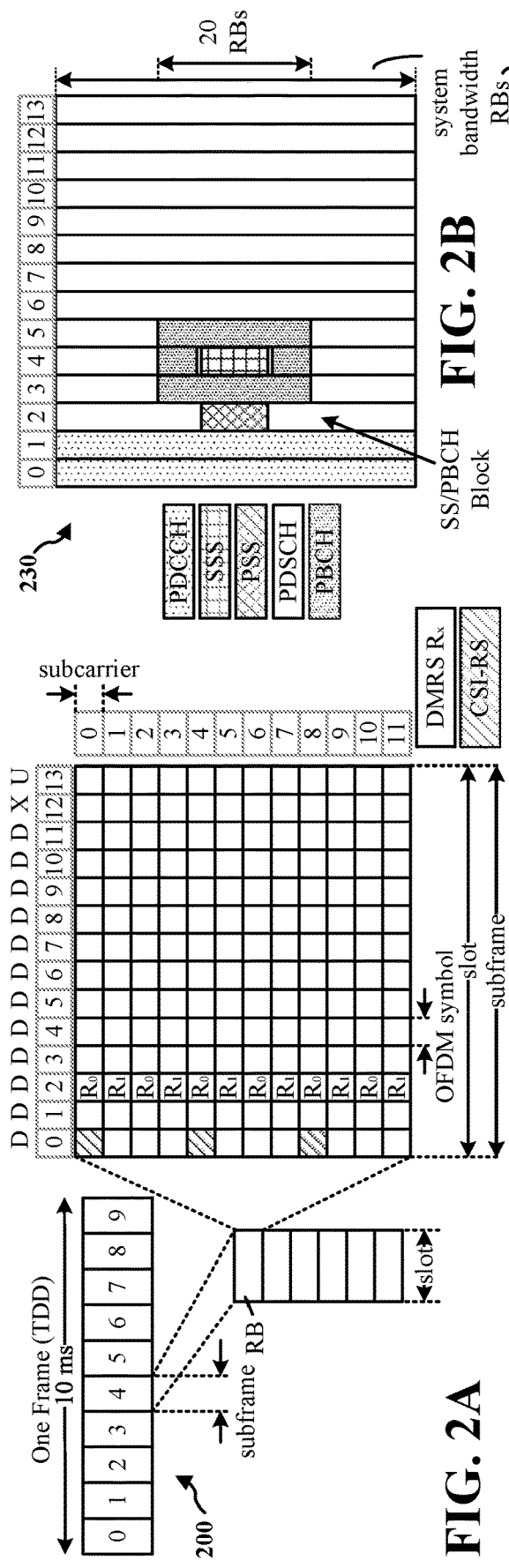
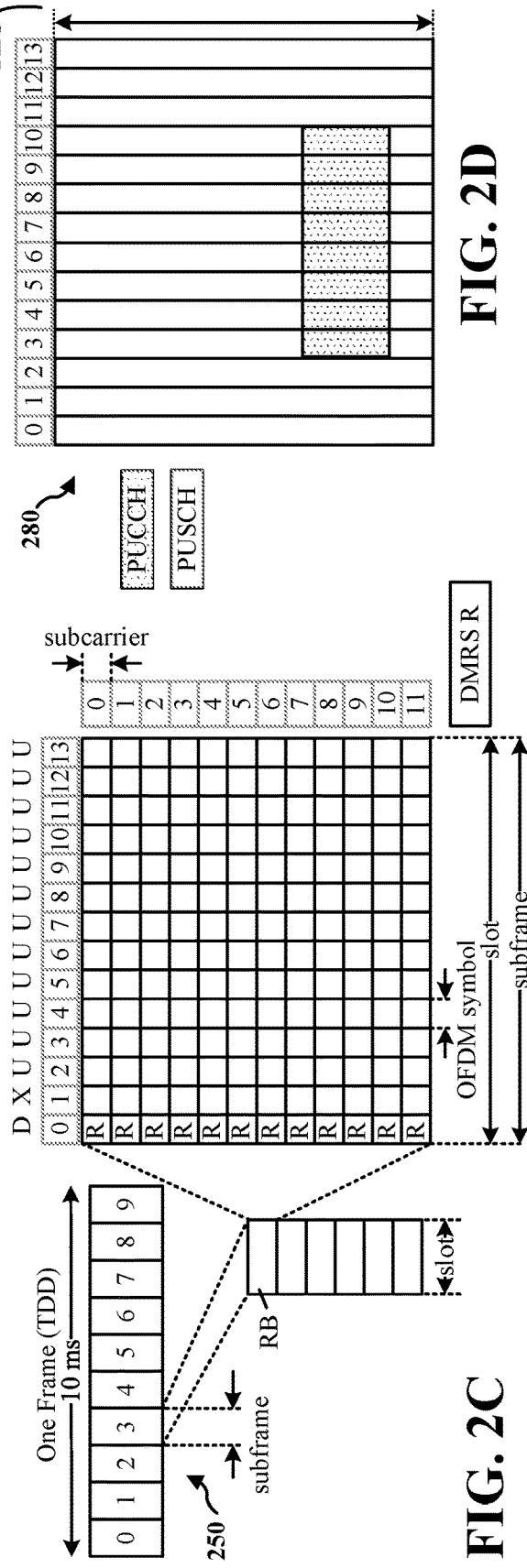
FIG. 2A  FIG. 2B  FIG. 2C  FIG. 2D

TECHNIQUES FOR INDICATING LACK OF DATA FOR TRANSMISSION

CROSS REFERENCE TO RELATED APPLICATION

The current application claims the benefit of U.S. Provisional Application No. 62/868,473, entitled "TECHNIQUES FOR INDICATING LACK OF DATA FOR TRANSMISSION," filed on Jun. 28, 2019, which is assigned to the assignee hereof and hereby expressly incorporated by reference herein for all purposes.

BACKGROUND

Technical Field

The present disclosure relates generally to communication systems, and more particularly, to techniques for a user equipment to indicate, to a base station or other wireless device, when there is a lack of data at the user equipment for transmission.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure provide techniques for a user equipment (UE) to indicate a lack of data for transmission. For example, a UE may transmit an indication to a base station indicating that no data is available for transmission or that no data was transmitted with regard to an allocated transmission time interval (TTI) or the like. Such an indication (e.g., a no-data indication) may, for example, be considered by a base station concerning the allocation of resources for the UE. In one example, such a no-data indication may result in a base station not allocating certain additional resources for the UE, e.g., for retransmission purposes.

In an aspect of the disclosure, a method, a non-transitory computer-readable medium, and an apparatus are provided that facilitate wireless communications implemented by the UE. The method may include determining whether the UE has any data to transmit during a configured grant occasion allocated to the UE by a base station. The method may further include generating a no-data indication based on a determination that the UE does not have any data for transmission during the configured grant occasion. In some examples, the method may further include transmitting the no-data indication to the base station.

In some aspects of the present disclosure, a non-transitory computer-readable medium may include instructions that, when executed by a processor of a UE, causes the processor to determine whether the UE has any data to transmit during a configured grant occasion allocated to the UE by a base station, generate a no-data indication based on a determination that the does not have any data for transmission during the configured grant occasion, and transmit the no-data indication to the base station.

In certain aspects, a UE may include a memory storing instructions, and a processor communicatively coupled to the memory, the processor being configured to execute the instructions to determine whether the UE has any data to transmit during a configured grant occasion allocated to the UE by a base station, generate a no-data indication based on a determination that the UE does not have any data for transmission during the configured grant occasion, and transmit the no-data indication to the base station.

Some aspects of the disclosure includes a UE including means for determining whether the UE has any data to transmit during a configured grant occasion allocated to the UE by a base station, means for generating a no-data indication based on a determination that the UE does not have any data for transmission during the configured grant occasion, and means for transmitting the no-data indication to the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating a first example of a 5G/NR frame.

FIG. 2B is a diagram illustrating an example of DL channels within a 5G/NR subframe.

FIG. 2C is a diagram illustrating a second example of a 5G/NR frame.

FIG. 2D is diagram illustrating an example of UL channels within a 5G/NR subframe.

DETAILED DESCRIPTION

Figure 1:
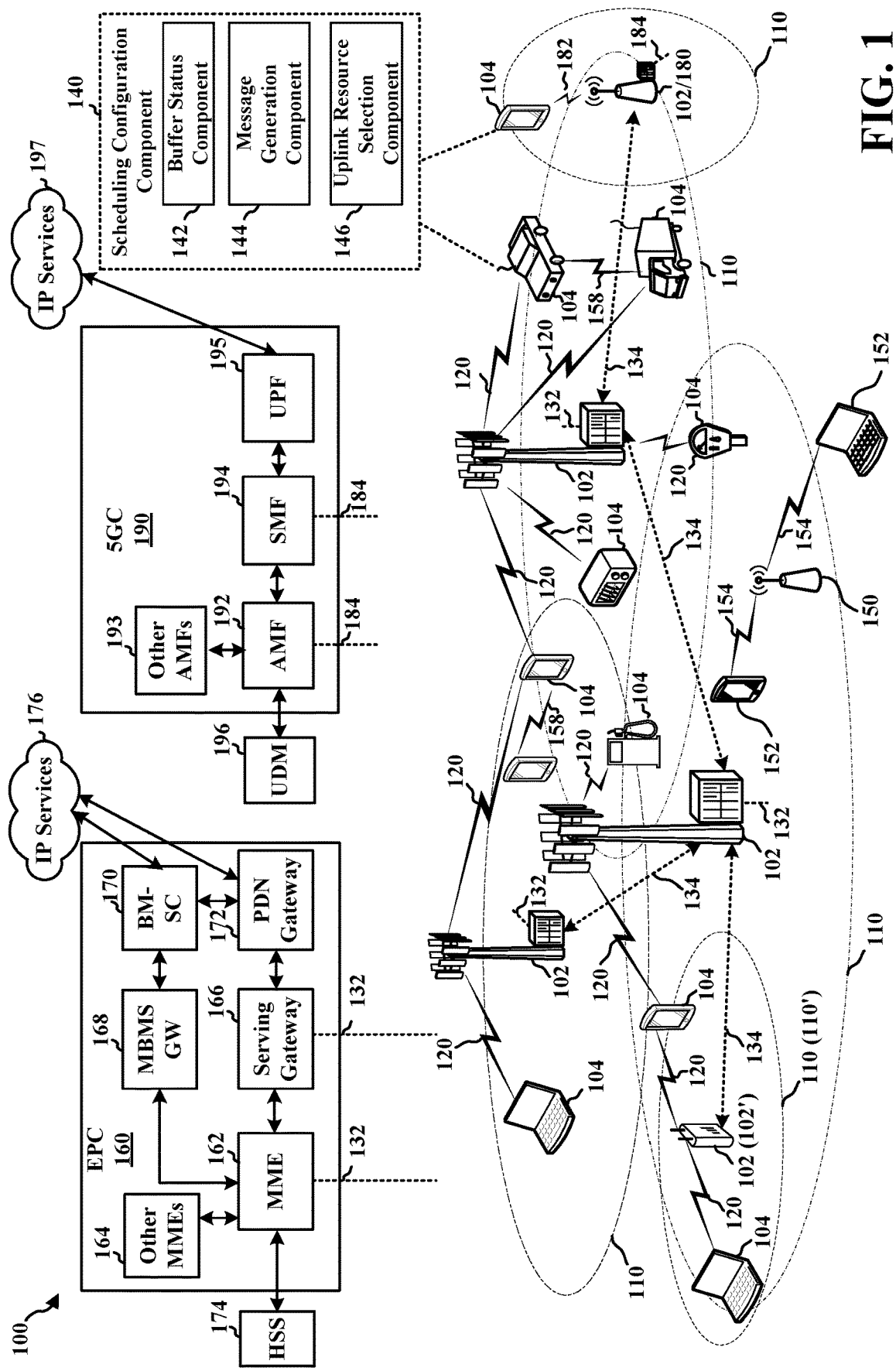
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, one requirement for wireless communication is minimizing packet transmission latency for reliable and low latency services. The existing wireless systems have several fundamental limitations preventing it from supporting low latency. For example, one obstacle is the radio resource allocation delay that may exist between a base station and one or more user equipments (UEs). When a UE wants to transmit packets, a radio resource grant procedure precedes the packet transmission. To transmit a resource scheduling request and send packets on the scheduled resource, a UE needs at least eight (8) milliseconds (ms). In long term evolution (LTE), the semi-persistent scheduling (SPS) feature was introduced for periodic data transmissions like voice over IP (VoIP) services. When a base station configures SPS radio resources, a UE can employ the periodic resources, without an additional scheduling request procedure. However, one drawback of this implementation is that when the UE does not have data to transmit, the resources are generally wasted and left unused.

To reduce the waste of periodically allocated resources, 5G enables sharing of resources via one or more scheduling configurations and/or configured grants. In such implementation, the base station may allocate the one or more scheduling configurations and/or configured grant resources to requesting UEs, and the UEs may utilize the resources when they have data to transmit. By assigning the scheduling configurations and/or configured grant resources, the 5G network eliminates the packet transmission delay for a scheduling request procedure and increases the utilization ratio of allocated periodic radio resources. However, in some instances, a UE may not have any data to transmit, yet is going to be, is in the process of being, or has been allocated resources by the base station for a particular transmission time interval (TTI). In such instances, if the base station does not receive any uplink data from the UE on the allocated resources during an expected TTI, the base station may assume that the uplink data may have been lost in transmission (e.g., due to poor channel conditions or communication link). As such, the base station may allocate a second set of resources for the UE to attempt retransmission. However, allocating another set of resources to transmit non-existent data from the UE may waste additional resources that may be allocated to other transmissions by other UEs.

Aspects of the present disclosure provide techniques for transmitting an indication from the UE to the base station indicating that no data has been, is being, or is going to be transmitted during the allocated transmission time interval in order to prevent the reallocation of resources for retransmission. In one example, the UE may transmit an indication that no data is being transmitted in at least portion of the allocated configuration grant and/or scheduling configurations. To this end, the time resources per scheduling configuration and/or configured grant occasion may be split into multiple parts: a first time period for transmitting indications of whether or not the UE has data to transmit and a second time period for transmitting data, if available, over the physical uplink shared channel (PUSCH). As such, the UE may transmit PUSCH if the UE has data to transmit, and transmit the "no data" indication if there is no data to be transmitted. Such signaling may prevent the base station from allocating additional resources for retransmission.

Additionally or alternatively, the time resources per configured grant occasion may not be time division multiplexed (TDMed). Indeed, in some instances, the PUSCH, if transmitted, may partially or fully overlap in time/frequency with the region in which the no-data indicator is sent. Additionally, it should be appreciated that the no-data indicator may not necessarily utilize all the resource elements (REs) of the orthogonal frequency division multiplexing (OFDM) symbol. Instead, the no-data indicator may be transmitted on one or more REs in one or more OFDM symbols.

In another example, the no-data indication may be transmitted on resources shared by multiple UEs. In other words, each UE may not require dedicated resources for transmitting the no-data indication to the base station in order to save signaling overhead. In such implementation, one or more UEs may select a resource randomly or according to the order in PUSCH occasion that is sensed without energy to transmit the no-data indication. If the UE selects resources randomly, the base station may use pseudo-omni beam to receive potential indicator(s) from unknown UEs. In contrast, if the UE selects resources based on sensing the energy, the base station may predict the UE per resource in the same way and prepare the corresponding receiver beam to receive the indication with improved link quality.

Additionally, in some instances, the no-data indication may be aligned across different cells in order to prevent interference with PUSCH transmissions from neighboring cells. As such, the time duration for no-data indication may be exchanged and coordinated across a plurality of cells by the base stations such that each cell can schedule uplink data transmission, which is rate matched around the no-data indicator time duration of neighboring cells to avoid interference.

In some examples, the no-data indication may be transmitted as a dummy null packet, or alternatively an "empty packet" (e.g., a packet is sent that contains no actual data, but only packet header) in order to prevent the base station from allocating additional resources for retransmission. In such instances, the packet may be one or both of buffer status report (BSR) or power headroom report (PHR). For example, the UE may transmit a BSR if a BSR value indicates there is data in the buffer, else transmit PHR. This could be done either by explicitly setting BSR/PHR trigger configuration parameters so that the reports are always transmitted, or by special conditions that bypass the BSR/PHR reporting rules for these IIOT/CG configuration. Finally, it should be appreciated that the base station may switch between the multiple types of configurations discussed above based in part on load factors (e.g., percentage of time UEs have data to transmit).

Several aspects of telecommunication systems will now be presented with reference to various apparatus and methods. These apparatus and methods will be described in the following detailed description and illustrated in the accompanying drawings by various blocks components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

In certain aspects, one or more of the UEs 104 may include a scheduling configuration component 140 configured to manage uplink communication during the configured grant period. The scheduling configuration component 140 may include a buffer status component 142 for determining whether the UE 104 has any data to transmit during a configured grant occasion allocated to the UE by a base station 102. The scheduling configuration component 140 may include message generation component 144 for generating a no-data indication based on a determination that a UE transmission buffer fails to include any data for transmission during the configured grant occasion allocated to the UE. The scheduling configuration component 140 may include uplink resource selection component 146 for transmitting, via transceiver 502 (see FIG. 5), the no-data indication to the base station to prevent the base station from allocating additional resources to the UE for retransmission.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154, e.g., in a 5 GHz or other like unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same (e.g., 5 GHz) unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3A:
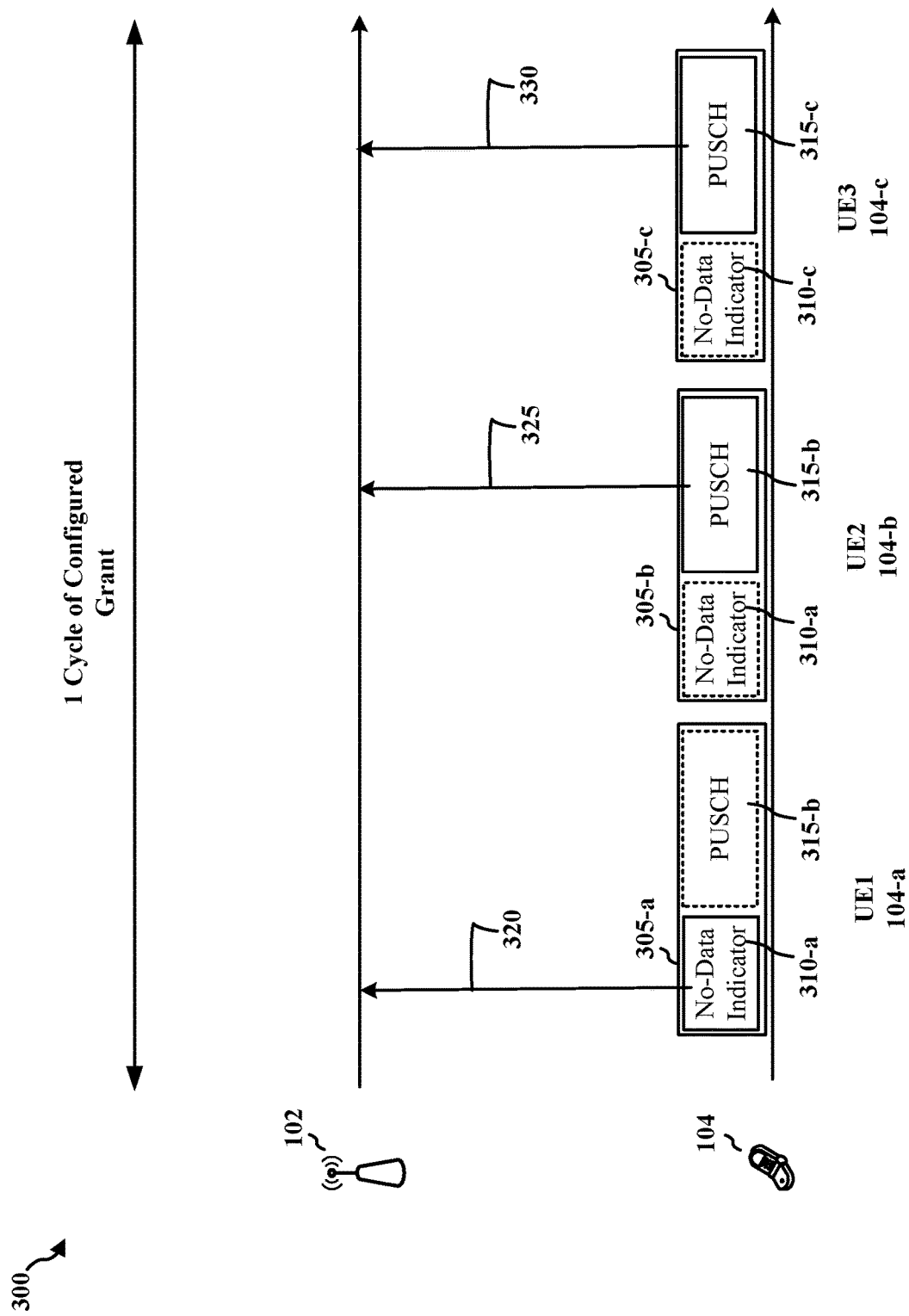
FIG. 3A is a first example of a message diagram message diagrams illustrating example messages and processes for transmitting no-data indicator from the UE to the base station to prevent allocation of additional resources for retransmission by the base station.

FIG. 3A is an example messages diagram 300 between a base station 102 and a UE 104 for indicating no-data transmission from the UE 104 during scheduling configuration and/or configured grant period in order to prevent scheduling of retransmission resources by the base station 102. In one example, the UE 104 may transmit an indication that no data is being transmitted in at least portion of the allocated configuration grant and/or scheduling configurations. While the example below illustrates the resource allocation and/or "no data" indication associated with one or more configuration grant, aspects of the present disclosure may also include resource allocation and/or "no data" indication during scheduling configuration period.

To this end, the time resources 305 per configured grant occasion for each UE 104 may be split into multiple parts: a first time period 310 for transmitting indications of whether or not the UE 104 has data to transmit and a second time period 315 within the same configured grant period for transmitting data, if available, over the PUSCH. As such, the UE 104 may transmit PUSCH if the UE 104 has data to transmit, and transmit the "no data" indication if there is no data to be transmitted.

For instance, as illustrated in FIG. 3A, the time resources of the first configured grant occasion (or period) 305-*a* associated with the first UE 104-*a* (UE1) may be split into a first time period 310-*a* for transmitting a no-data indicator if the first UE 104-*a* determines that there is no data pending for transmission in the transmission buffer, and the second time period 315-*b* in the event that the first UE 104-*a* has data to transmit. In the illustrated example, the first UE 104-*a* may transmit the no-data indication 320 during the first time period 310-*a* of the first configured grant occasion 305-*a* for the first UE 104-*a* indicating that the first UE 104-*a* does not intend to transmit any data to the base station 102. As such, the first UE 104-*a* may omit transmitting any data during the second time period 315-*b* (dotted lines illustrated lack of transmission). By transmitting the no-data indicator 310-*a*, the base station 102 may be prevented from mistaking that the data from the first UE 104-*a* was lost in transmission and scheduling additional resources for retransmission that may be wasted.

However, in the illustrated example, the second UE 104-*b* may have data to transmit. As such, the second UE 104-*b*, during the second configured grant occasion 305-*b* associated with the second UE 104-*b* (UE2), may transmit the data over PUSCH 325 during the second time period 315-*b* of the second configured grant occasion 305-*b* (dotted lines of no-data indicator 310 signaling that the no-data indicator is not transmitted for UE2). Similarly, with respect to the third UE 104-*c*, the data 330 associated with the third UE 104-*c* may also be transmitted during the second time period 315-*c* of the third configured grant occasion 305-*c* based on the determination that the third UE 104-*c* has data to transmit.

It should be appreciated that the time resources per configured grant occasion 305 may not be TDMed. Indeed, in some instances, the PUSCH 315, if transmitted, may partially or fully overlap in time/frequency with the region in which no-data indicator 310 is sent. Additionally, it should be appreciated that the no-data indicator 310 may not necessarily utilize all the REs of the OFDM symbol. Instead, the no-data indicator may be transmitted on one or more REs in the one or more OFDM symbols.

Figure 3B:
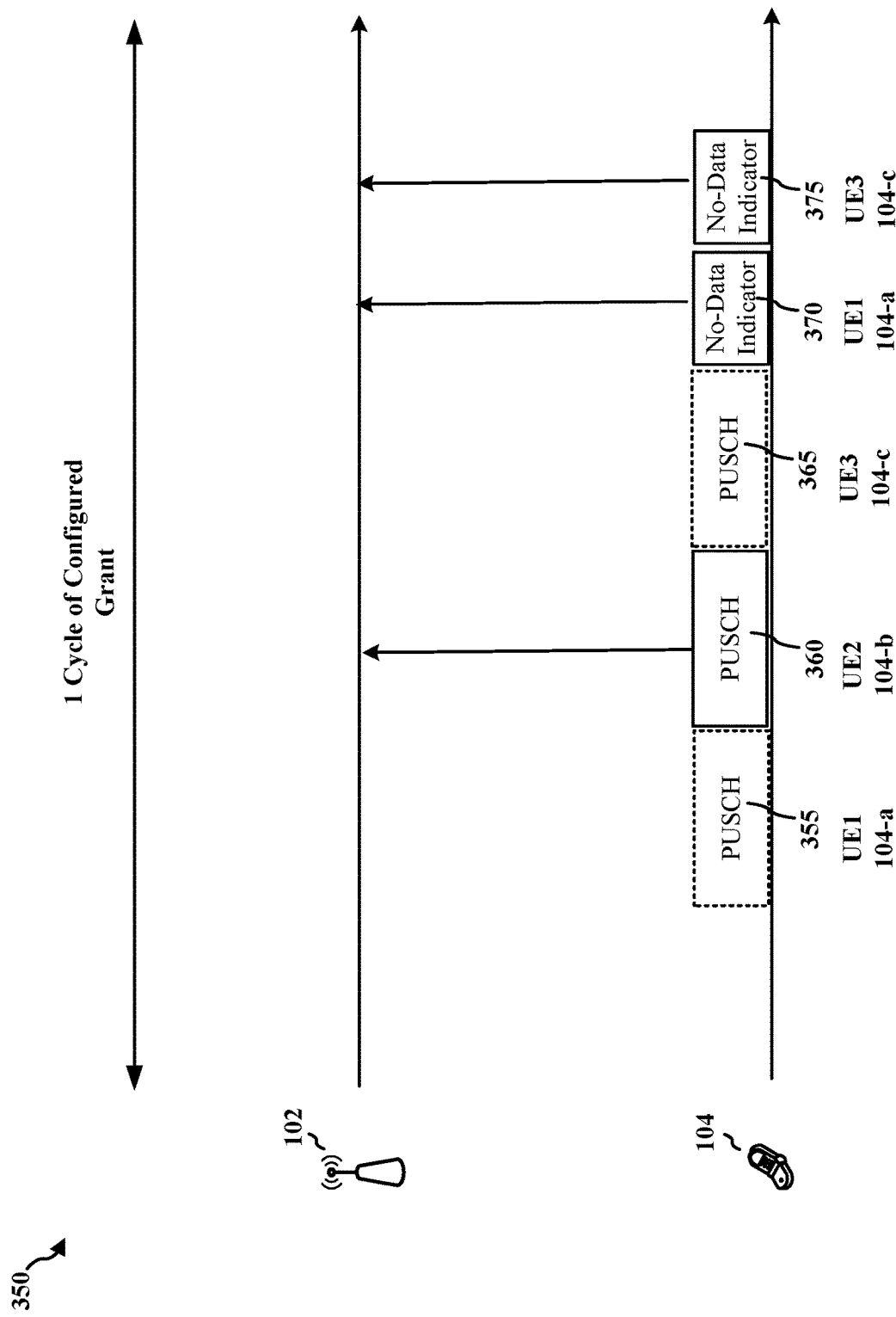
FIG. 3B is a second example of a message diagram illustrating example messages and processes for transmitting no-data indicator from the UE to the base station to prevent allocation of additional resources for retransmission by the base station.

FIG. 3B is another example messages diagram 350 between a base station 102 and a UE 104 for indicating no-data transmission from the UE 104 during configured grant period in order to prevent scheduling of retransmission resources by the base station 102. In an alternative example, the no-data indications may be transmitted on resources shared by multiple UEs. In other words, each UE may not require dedicated resources for transmitting the no-data indication to the base station in order to save signaling overhead. For example, the first UE 104-*a* (UE1) and third UE 104-*c* (UE3) may not have any data to transmit as illustrated by dotted lines of PUSCH in FIG. 3B (see elements 355 and 365). Instead, only the second UE 104-*b* (UE2) may have data 360 for transmission to the UE during the configured grant occasion.

In such implementation, the first UE 104-*a* (UE1) and third UE 104-*c* (UE3) may select a resource randomly or according to the order in PUSCH occasion that is sensed without energy to transmit the no-data indication (e.g., transmitting no-data indications 370 and 375 for UE1 and UE3). If the UE 104 selects resources randomly, the base station 102 may use pseudo-omni beam to receive potential indicator from unknown UEs. In contrast, if the UE selects resources based on sensing the energy, the base station may predict the UE per resource in same way and prepare the corresponding receiver beam to receive the indication with improved link quality.

Additionally, it should be appreciated that in some instances, the no-data indication may be aligned across different cells in order to prevent interference with PUSCH transmissions from neighboring cells. As such, the time duration for no-data indication may be exchanged and coordinated across plurality of cells by the base stations such that each cell can schedule uplink data transmission, which is rate matched around the no-data indicator time duration of neighboring cells to avoid interference.

In further examples, the no-data indication may be transmitted as a dummy null packet, or alternatively an "empty packet" (e.g., a packet is sent that contains no real data) in order to prevent the base station from allocating additional resources for retransmission. In such instances, the packet may be one or both of buffer status report (BSR) or power headroom report (PHR). For example, the UE may transmit a BSR if a BSR value indicates there is data in the buffer, else if transmit PHR. This could be done either by explicitly setting BSR/PHR trigger configuration parameters so that the reports are always transmitted, or by special conditions that bypass the BSR/PHR reporting rules for these IIOT/CG configuration. Finally, it should be appreciated that the base station may switch between the multiple types of configurations discussed above based in part on load factors (e.g., percentage of time UEs have data to transmit).

In some implementations, the no-data indication in uplink may be encapsulated in the PUSCH as a separate medium access control (MAC) control element (CE).

In some aspects of the present disclosure, the transmission of the "no data" indication by the UE may occur before the granting of the resources (e.g., scheduling configuration period), concurrent with the granting of the resources (at least a part), and/or after the granting of the resources.

In other aspects, the transmission of the "no data" indication may indicate that the UE no data has been, is being, or is going to be transmitted by the UE to the BS. For example, the UE may transmit the "no data" indication before resources has been allocated by the BS to the UE to inform the BS that the UE is not going to transmit any data to the BS. In another example, the UE may transmit the "no data" indication while the resources are being allocated by the BS to the UE. In certain examples, the UE may transmit the "no data" indication after one or more resources have been allocated by the BS. In response, the BS may withhold, reallocate, and/or deny the resources allocated to the UE.

Figure 4:
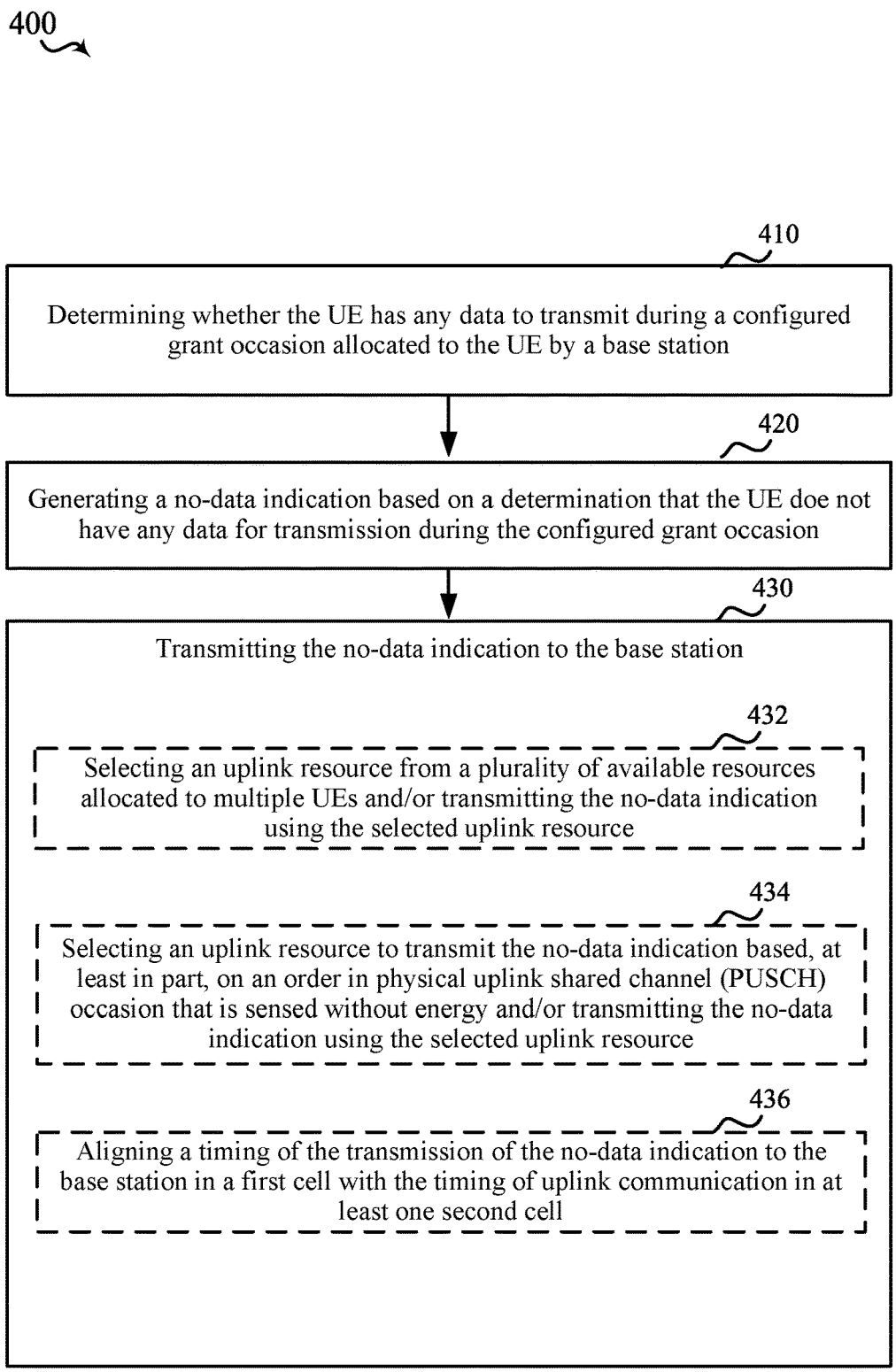
FIG. 4 is a flowchart showing an example method for wireless communications for a UE.

FIG. 4 is a flowchart showing an example method 400 of transmitting a no-data indication to the base station in order to prevent reallocation of additional resources in a configured grant. The method 400 may be performed by the UE 104 including the scheduling configuration component 140 and subcomponents thereof. The method 400 may include communications with one or more base stations 102.

In block 410, the method 400 may include determining whether the UE has any data to transmit during a configured grant occasion allocated to the UE by a base station. In an aspect, for example, the UE 104, the processor 512, and/or the modem 514 may execute the buffer status component 142 to receive indication whether the UE has any data pending for transmission to the base station in the current configured grant time interval. Thus, the UE 104, the processor 512, and/or the modem 514 executing the scheduling configuration component 140 and/or the buffer status component 142 or one of its subcomponents may define the means for determining whether the UE 104 has any data to transmit during a configured grant occasion allocated to the UE 104 by a base station 102.

In block 420, the method 400 may include generating a no-data indication based on a determination that the UE does not have any data for transmission during the configured grant occasion. In an aspect, for example, the UE 104, the processor 512, and/or the modem 514 may execute the message generation component 144 to generate an indication for transmission to the base station identifying whether the UE has any data to transmit during the configured grant occasion. In some examples, the no-data indication may be a null packet transmitted to the base station to prevent allocation of additional resources by the base station. The null packet may include one or both of BSR or PHR. Thus, the UE 104, the processor 512, and/or the modem 514 executing the scheduling configuration component 140 and/or the message generation component 144 or one of its subcomponents may define the means for generating a no-data indication based on a determination that the UE does not have any data for transmission during the configured grant occasion.

In block 430, the method 400 may include transmitting the no-data indication to the base station. In an aspect, for example, the UE 104, the processor 512, the modem 514, and/or transceiver 502 may execute the uplink resource selection component 146 to transmit the no-data indication message generated by the UE 104 to the base station 102. In certain implementations, the UE 104 may transmit the no-data indication to the BS 102 to prevent the BS 102 from allocating additional resources to the UE 104 for retransmission. In some examples, the configured grant occasion may include a first time period for the UE 104 to transmit indications of whether the UE has any data to transmit and a second time period for transmitting data over the PUSCH if the UE 104 has data to transmit. In other examples, the no-data indicator and the PUSCH may partially overlap in one or both of time or frequency within a region of the configured grant occasion. To this end, in some aspects, the UE 104 may transmit the no-data indication during the configured grant occasion (e.g., during the first time period) when there is no data to transmit. However, if the UE 104 determines that there is data to transmit, the UE 104 may transmit the data in PUSCH during the second time period.

In such instances, the UE 104 may elect to not transmit any indication during the first time period when there is data to be transmitted, or alternatively, the UE 104 may transmit a message indicating that the UE 104 will subsequently transmit a message. In some instances, the no-data indication may be transmitted using less than all available resource elements in an OFDM symbol. Thus, the UE 104, the processor 512, transceiver 502 and/or the modem 514 executing the scheduling configuration component 140 and/or the uplink resource selection component 146 or one of its subcomponents may define the means for transmitting the no-data indication to the base station.

For example, in sub-block 432, the block 430 may optionally include selecting an uplink resource from a plurality of available resources allocated to multiple UEs and/or transmitting the no-data indication using the selected uplink resource. For example, the uplink resource selection component 146 may be configured to randomly select resources allocated to any of the plurality of UEs to transmit an indication that the first UE 104 may not transmit data during the configured grant occasion associated with the first UE. The plurality of available resources allocated to the multiple UEs may be allocated for the transmission of the no-data indication and/or other uplink transmissions of data and/or control information.

As another example, in sub-block 434, the block 430 may optionally include selecting an uplink resource to transmit the no-data indication based, at least in part, on an order in PUSCH occasion that is sensed without energy and/or transmitting the no-data indication using the selected uplink resource.

As another example, in sub-block 436, the block 430 may optionally include aligning a timing of the transmission of the no-data indication to the base station in a first cell with the timing of uplink communication in at least one second cell. For example, the timing durations for transmitting the no-data indicator may be aligned across different neighboring cells so that the transmissions from one cell may not interference with PUSCH transmissions in neighboring cell. Thus, time durations for no-data indicator may be exchanged across cells such that each cell can schedule uplink data transmission, which is rate matched around the no-data indicator time durations of neighboring cells to avoid interference.

Figure 5:
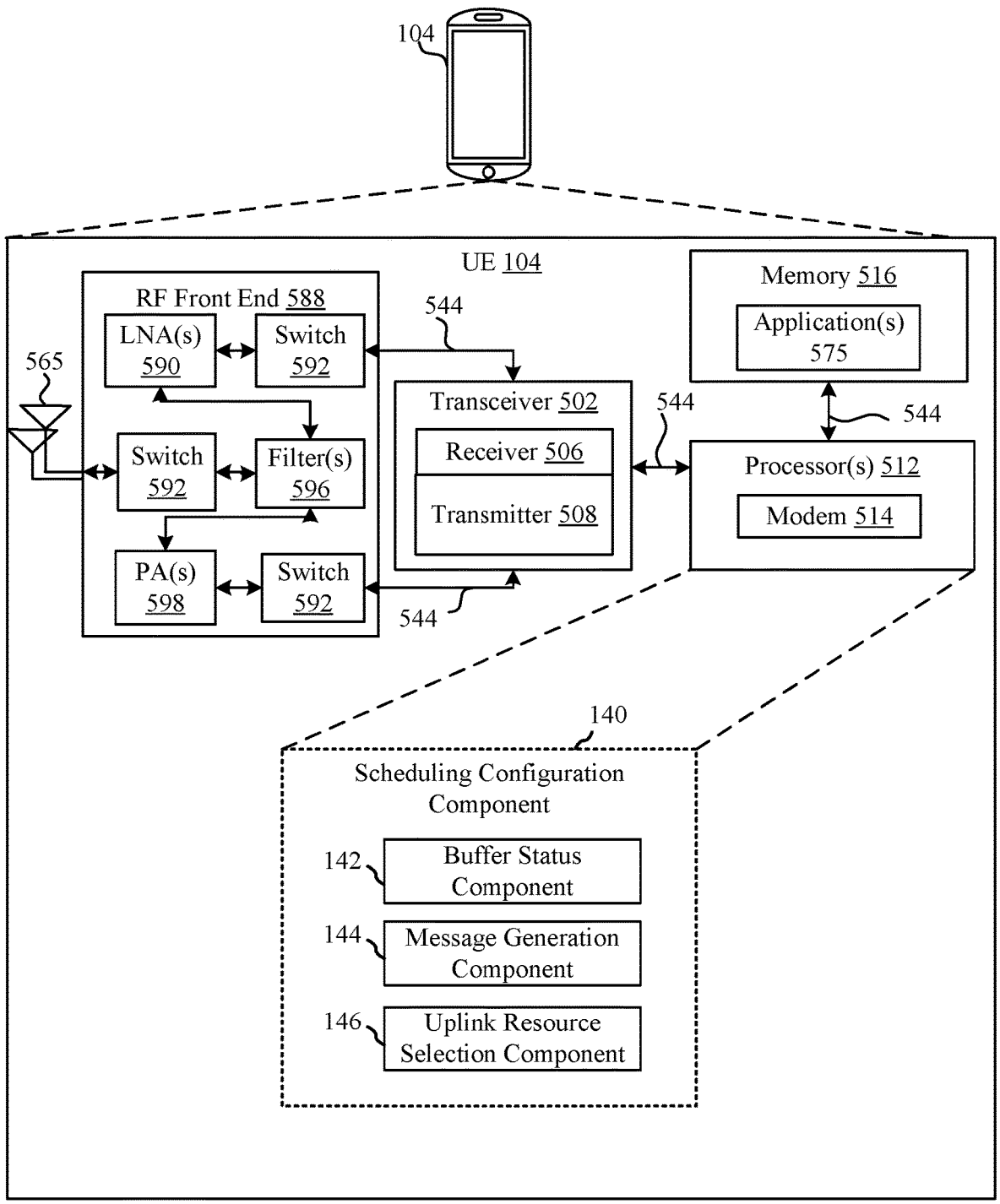
FIG. 5 is a schematic diagram of example components of the UE of FIG. 1.

Referring to FIG. 5, one example of an implementation of UE 104 may include a variety of components, some of which have already been described above, but including components such as one or more processors 512 and memory 516 and transceiver 502 in communication via one or more buses 544, which may operate in conjunction with modem 514, and scheduling configuration component 140 to enable one or more of the functions described herein related to transmitting a no-data indication to the base station when the UE does not have any data to transmit during the configured grant occasion. Further, the one or more processors 512, modem 514, memory 516, transceiver 502, RF front end 588 and one or more antennas 565 may be configured to support voice and/or data calls (simultaneously or non-simultaneously) in one or more radio access technologies. The antennas 565 may include one or more antennas, antenna elements, and/or antenna arrays.

In an aspect, the one or more processors 512 may include a modem 514 that uses one or more modem processors. The various functions related to scheduling configuration component 140 may be included in modem 514 and/or processors 512 and, in an aspect, may be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with scheduling configuration component 140 may be performed by transceiver 502.

Also, memory 516 may be configured to store data used herein and/or local versions of applications 575, scheduling configuration component 140 and/or one or more of subcomponents thereof being executed by at least one processor 512. Memory 516 may include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining scheduling configuration component 140 and/or one or more of subcomponents thereof, and/or data associated therewith, when UE 104 is operating at least one processor 512 to execute scheduling configuration component 140 and/or one or more subcomponents thereof.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 102. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, UE 104 may include RF front end 588, which may operate in communication with one or more antennas 565 and transceiver 502 for receiving and transmitting radio transmissions, for example, wireless communications transmitted by at least one base station 102 or wireless transmissions transmitted by UE 104. RF front end 588 may be connected to one or more antennas 565 and may include one or more low-noise amplifiers (LNAs) 590, one or more switches 592, one or more power amplifiers (PAs) 598, and one or more filters 596 for transmitting and receiving RF signals.

In an aspect, LNA 590 may amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 may be used by RF front end 588 to filter a received signal to obtain an input RF signal. Similarly, in an aspect, for example, a respective filter 596 may be used to filter an output from a respective PA 598 to produce an output signal for transmission. In an aspect, each filter 596 may be connected to a specific LNA 590 and/or PA 598. In an aspect, RF front end 588 may use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver 502 may be tuned to operate at specified frequencies such that UE 104 can communicate with, for example, one or more base stations 102 or one or more cells associated with one or more base stations 102. In an aspect, for example, modem 514 may configure transceiver 502 to operate at a specified frequency and power level based on the UE configuration of the UE 54 and the communication protocol used by modem 514.

In an aspect, modem 514 may be a multiband-multimode modem, which can process digital data and communicate with transceiver 502 such that the digital data is sent and received using transceiver 502. In an aspect, modem 514 may be multiband and be configured to support multiple frequency bands for a specific communications protocol. In an aspect, modem 514 may be multimode and be configured to support multiple operating networks and communications protocols. In an aspect, modem 514 may control one or more components of UE 104 (e.g., RF front end 588, transceiver 502) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 6:
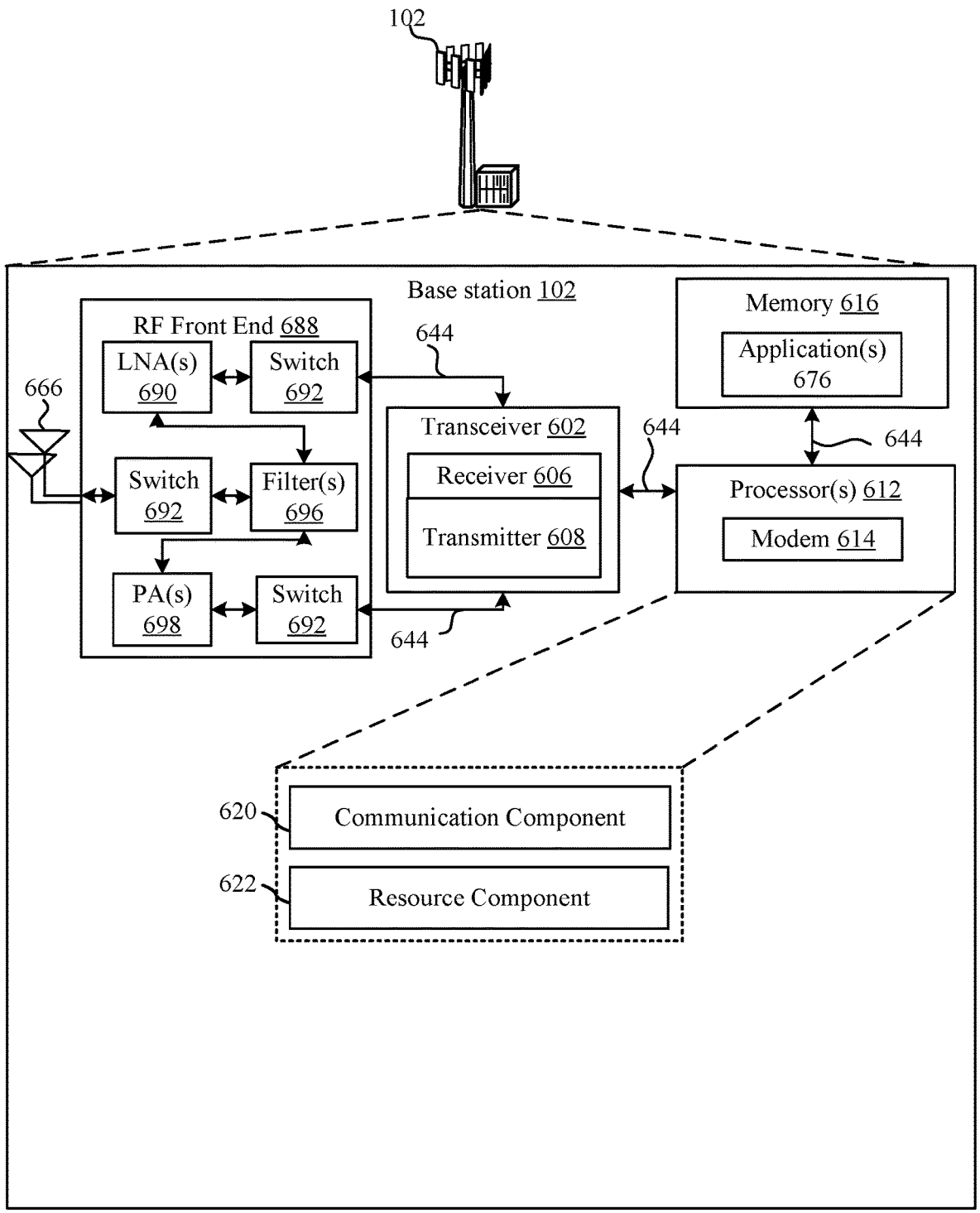
FIG. 6 is a schematic diagram of example components of the base station of FIG. 1.

Referring to FIG. 6, one example of an implementation of base station 102 may include a variety of components, some of which have already been described above, but including components such as one or more processors 612 and memory 616 and transceiver 602 in communication via one or more buses 644, which may operate in conjunction with modem 614, and a communication component 620 to enable one or more of the functions described herein related to receiving a no-data indication from the UE when the UE does not have any data to transmit during the configured grant occasion. The base station 102 may include a resource component 622 that manages resources scheduled and/or allocated to one or more UEs in a communication network. Further, the one or more processors 612, modem 614, memory 616, transceiver 602, RF front end 688 and one or more antennas 665 may be configured to support voice and/or data calls (simultaneously or non-simultaneously) in one or more radio access technologies. The antennas 665 may include one or more antennas, antenna elements, and/or antenna arrays.

In an aspect, the one or more processors 612 may include a modem 614 that uses one or more modem processors. The various functions related to the communication component 620 and/or the resource component 622 may be included in modem 614 and/or processors 612 and, in an aspect, may be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 614 associated with the communication component 620 and/or the resource component 622 may be performed by transceiver 602.

Also, memory 616 may be configured to store data used herein and/or local versions of applications 675, the communication component 620 and/or the resource component 622 and/or one or more of subcomponents thereof being executed by at least one processor 612. Memory 616 may include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining the communication component 620, the resource component 622, and/or one or more of subcomponents thereof, and/or data associated therewith, when the base station 102 is operating at least one processor 612 to execute the communication component 620, the resource component 622, and/or one or more subcomponents thereof.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one UE 104. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, the base station 102 may include RF front end 688, which may operate in communication with one or more antennas 665 and transceiver 602 for receiving and transmitting radio transmissions, for example, wireless communications transmitted by at least one base station 102 or wireless transmissions transmitted by UE 104. RF front end 688 may be connected to one or more antennas 665 and may include one or more low-noise amplifiers (LNAs) 690, one or more switches 692, one or more power amplifiers (PAs) 698, and one or more filters 696 for transmitting and receiving RF signals.

In an aspect, LNA 690 may amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 may be used by RF front end 688 to filter a received signal to obtain an input RF signal. Similarly, in an aspect, for example, a respective filter 696 may be used to filter an output from a respective PA 698 to produce an output signal for transmission. In an aspect, each filter 696 may be connected to a specific LNA 690 and/or PA 698. In an aspect, RF front end 688 may use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver 602 may be tuned to operate at specified frequencies such that base station 102 can communicate with, for example, one or more UEs 104. In an aspect, for example, modem 614 may configure transceiver 602 to operate at a specified frequency and power level based on the base station configuration of the base station 102 and the communication protocol used by modem 614.

In an aspect, modem 614 may be a multiband-multimode modem, which can process digital data and communicate with transceiver 602 such that the digital data is sent and received using transceiver 602. In an aspect, modem 614 may be multiband and be configured to support multiple frequency bands for a specific communications protocol. In an aspect, modem 614 may be multimode and be configured to support multiple operating networks and communications protocols. In an aspect, modem 614 may control one or more components of the base station 102 (e.g., RF front end 688, transceiver 602) to enable transmission and/or reception of signals from the network based on a specified modem configuration. In an aspect, the modem configuration may be based on the mode of the modem and the frequency band in use. In another aspect, the modem configuration may be based on base station configuration information associated with based station 102.

Figure 7:
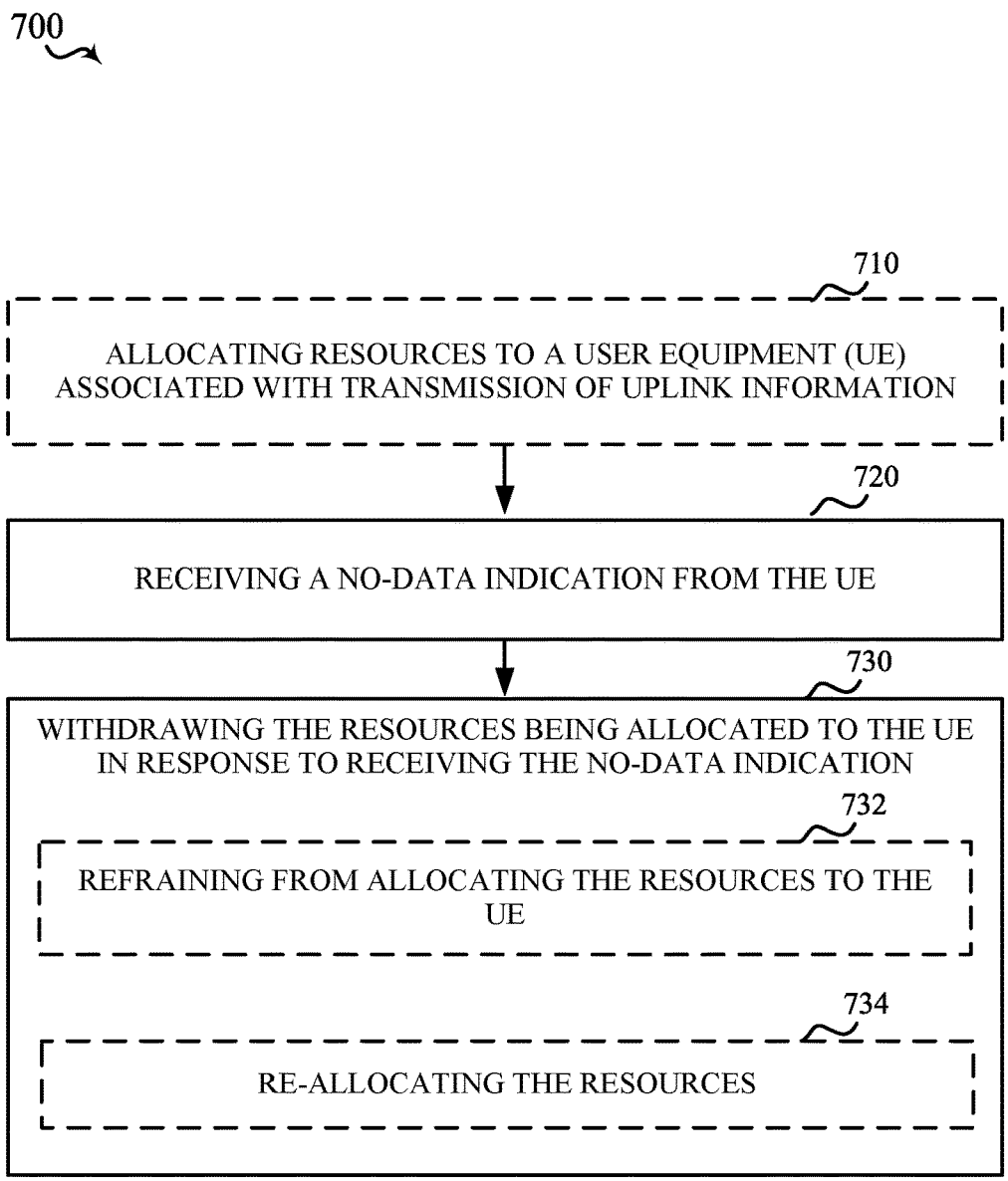
FIG. 7 is a flowchart showing an example method for wireless communications for a base station.

FIG. 7 is a flowchart showing an example method 700 of receiving a no-data indication by the base station in order to prevent allocation of resources associated with a configured grant. The method 700 may be performed by the base station 102 including the communication component 620 and/or the resource component 622, and subcomponents thereof. The method 700 may include communications with one or more UEs 104.

At block 710, the method 700 may optionally allocate resources to a user equipment (UE) associated with transmission of uplink information. In an aspect, for example, the base station 102, the processor 612, and/or the modem 614 may execute the resource component 622 of the base station 102 to allocate resources to the UE 104 associated with the transmission of uplink information by the UE 104. In some variations, the base station 102 may schedule resources to the UE 104 for uplink information transmission. In some implementations, the processor 612, the modem 614, the resource component 622, and/or one or more of the subcomponents may define the means for allocating resources to the UE 104 associated with the uplink information transmission by the UE 104.

At block 720, the method 700 may receive a no-data indication from the UE. For example, the antennas, 666, the RF front end 688, the transceiver 602, the receiver 606, the processor 612, the modem 614, and/or the communication component 620 of the base station 102 may receive the no-data indication from the UE 104. The base station 102 may receive the no-data indication before, during, or after the scheduling of the resources, the allocation of resources, and/or transmitting the indication of the allocated resources. In some implementations, the RF front end 688 may receive the electrical signals converted from electro-magnetic signals. The RF front end 688 may filter and/or amplify the electrical signals. The transceiver 602 or the receiver 606 may convert the electrical signals to digital signals, and send the digital signals to the communication component 620. In some implementations, the antennas, 666, the RF front end 688, the transceiver 602, the receiver, the processor 612, the modem 614, and/or the communication component 620 of the base station 102 may define means for receiving a no-data indication from the UE 104.

At block 730, the method 700 may withdraw the resources being allocated to the UE in response to receiving the no-data indication. In an aspect, for example, the base station 102, the processor 612, and/or the modem 614 may execute the resource component 622 of the base station 102 to withdraw the resources being allocated to the UE 104. In some variations, at block 732, the base station 102 may refrain from allocating the resources to the UE 104. In some variations, at block 734, the base station 102 may re-allocate the resources. For example, the base station 102 may terminate the scheduling of the resources upon receiving the no-data indication. In another example, the base station 102 may withdraw the resources allocated to the UE 104. In certain examples, the base station 102 may re-allocate the resources for the UE 104 for another transmission/reception not associated with the no-data indication, or to another UE 104. In some implementations, the processor 612, the modem 614, the resource component 622, and/or one or more of the subcomponents may define the means for withdrawing the resources being allocated to the UE in response to receiving the no-data indication.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Some Further Example Implementations

An example method of wireless communication for a user equipment (UE), comprising: determining whether the UE has any data to transmit during a configured grant occasion allocated to the UE by a base station; generating a no-data indication based on a determination that a UE transmission buffer fails to include any data for transmission during the configured grant occasion allocated to the UE; and transmitting the no-data indication to the base station to prevent the base station from allocating additional resources to the UE for retransmission.

The above example method, wherein the configured grant occasion includes a first time period for the UE to transmit indications of whether the UE has any data to transmit and a second time period for transmitting data over the physical uplink shared channel (PUSCH) if the UE has data to transmit.

Any of the above example methods, wherein the no-data indicator and the PUSCH partially overlap in one or both of time or frequency within a region of the configured grant occasion.

Any of the above example methods, wherein the no-data indication is transmitted using less than all available resource elements in an orthogonal frequency division multiplexing (OFDM) symbol.

Any of the above example methods, wherein transmitting the no-data indication to the base station, comprises: selecting an uplink resource from a plurality of available resources allocated to multiple UEs to transmit the no-data indication.

Any of the above example methods, wherein transmitting the no-data indication to the base station, comprises: selecting an uplink resource to transmit the no-data indication based on an order in physical uplink shared channel (PUSCH) occasion that is sensed without energy.

Any of the above example methods, wherein transmitting the no-data indication to the base station, comprises: aligning a timing of the transmission of the no-data indication to the base station in a first cell with the timing of uplink communication in at least one second cell.

Any of the above example methods, wherein the no-data indication is a null packet transmitted to the base station to prevent allocation of additional resources by the base station.

Any of the above example methods, wherein the null packet includes one or both of buffer status report (BSR) or power headroom report (PHR).

Any of the above example methods, wherein the no-data indication is encapsulated in physical uplink shared channel (PUSCH) as a medium access control (MAC) control element (CE).

An example user equipment (UE) comprising: a memory storing computer executable instructions; and a processor communicatively coupled to the memory and configured to execute the instructions to: determine whether the UE has any data to transmit during a configured grant occasion allocated to the UE by a base station; generate a no-data indication based on a determination that a UE transmission buffer fails to include any data for transmission during the configured grant occasion allocated to the UE; and transmit the no-data indication to the base station to prevent the base station from allocating additional resources to the UE for retransmission.

The above example UE, wherein the configured grant occasion includes a first time period for the UE to transmit indications of whether the UE has any data to transmit and a second time period for transmitting data over the physical uplink shared channel (PUSCH) if the UE has data to transmit.

Any of the above example UE, wherein the no-data indicator and the PUSCH partially overlap in one or both of time or frequency within a region of the configured grant occasion.

Any of the above example UE, wherein the no-data indication is transmitted using less than all available resource elements in an orthogonal frequency division multiplexing (OFDM) symbol.

Any of the above example UE, wherein transmitting the no-data indication to the base station, comprises: selecting an uplink resource from a plurality of available resources allocated to multiple UEs to transmit the no-data indication.

Any of the above example UE, wherein the instructions to transmit the no-data indication to the base station are further configured to be executed by the processor to: select an uplink resource to transmit the no-data indication based on an order in physical uplink shared channel (PUSCH) occasion that is sensed without energy.

Any of the above example UE, wherein the instructions to transmit the no-data indication to the base station are further configured to be executed by the processor to: align a timing of the transmission of the no-data indication to the base station in a first cell with the timing of uplink communication in at least one second cell.

Any of the above example UE, wherein the no-data indication is a null packet transmitted to the base station to prevent allocation of additional resources by the base station.

Any of the above example UE, wherein the null packet includes one or both of buffer status report (BSR) or power headroom report (PHR).

An example non-transitory computer-readable medium storing computer executable instructions, comprising instructions for: determining whether a user equipment (UE) has any data to transmit during a configured grant occasion allocated to the UE by a base station; generating a no-data indication based on a determination that a UE transmission buffer fails to include any data for transmission during the configured grant occasion allocated to the UE; and transmitting the no-data indication to the base station to prevent the base station from allocating additional resources to the UE for retransmission.

An above example non-transitory computer-readable medium, wherein the configured grant occasion includes a first time period for the UE to transmit indications of whether the UE has any data to transmit and a second time period for transmitting data over the physical uplink shared channel (PUSCH) if the UE has data to transmit.

Any of the above example non-transitory computer-readable medium, wherein the no-data indicator and the PUSCH partially overlap in one or both of time or frequency within a region of the configured grant occasion.

Any of the above example non-transitory computer-readable medium, wherein the no-data indication is transmitted using less than all available resource elements in an orthogonal frequency division multiplexing (OFDM) symbol.

Any of the above example non-transitory computer-readable medium, wherein the instructions for transmitting the no-data indication to the base station, further comprise instructions for: selecting an uplink resource from a plurality of available resources allocated to multiple UEs to transmit the no-data indication.

Any of the above example non-transitory computer-readable medium, wherein the instructions for transmitting the no-data indication to the base station are further include instructions for: selecting an uplink resource to transmit the no-data indication based on an order in physical uplink shared channel (PUSCH) occasion that is sensed without energy.

Any of the above example non-transitory computer-readable medium, wherein the instructions for transmitting the no-data indication to the base station are further configured to be executed by the processor to: aligning a timing of the transmission of the no-data indication to the base station in a first cell with the timing of uplink communication in at least one second cell.

Any of the above example non-transitory computer-readable medium, wherein the no-data indication is a null packet transmitted to the base station to prevent allocation of additional resources by the base station.

Any of the above example non-transitory computer-readable medium, wherein the null packet includes one or both of buffer status report (BSR) or power headroom report (PHR).

An example apparatus for wireless communications, comprising: means for determining whether a user equipment (UE) has any data to transmit during a configured grant occasion allocated to the UE by a base station; means for generating a no-data indication based on a determination that a UE transmission buffer fails to include any data for transmission during the configured grant occasion allocated to the UE; and means for transmitting the no-data indication to the base station to prevent the base station from allocating additional resources to the UE for retransmission.

An above example apparatus, wherein the configured grant occasion includes a first time period for the UE to transmit indications of whether the UE has any data to transmit and a second time period for transmitting data over the physical uplink shared channel (PUSCH) if the UE has data to transmit.

Any of the above example apparatus, wherein the no-data indicator and the PUSCH partially overlap in one or both of time or frequency within a region of the configured grant occasion.

Any of the above example apparatus, wherein the no-data indication is transmitted using less than all available resource elements in an orthogonal frequency division multiplexing (OFDM) symbol.

Any of the above example apparatus, wherein the means for transmitting the no-data indication to the base station, further comprise: means for selecting an uplink resource from a plurality of available resources allocated to multiple UEs to transmit the no-data indication.

Any of the above example apparatus, wherein the means for transmitting the no-data indication to the base station are further include instructions for: means for selecting an uplink resource to transmit the no-data indication based on an order in physical uplink shared channel (PUSCH) occasion that is sensed without energy.

Any of the above example apparatus, wherein the means for transmitting the no-data indication to the base station are further configured to be executed by the processor to: means for aligning a timing of the transmission of the no-data indication to the base station in a first cell with the timing of uplink communication in at least one second cell.

Any of the above example apparatus, wherein the no-data indication is a null packet transmitted to the base station to prevent allocation of additional resources by the base station.

Any of the above example apparatus, wherein the null packet includes one or both of buffer status report (BSR) or power headroom report (PHR).

What is claimed is:

1. A method of wireless communication for a user equipment (UE), comprising:
   determining whether the UE has any data to transmit during a configured grant occasion allocated to the UE by a base station;
   generating a no-data indication based on a determination that the UE does not have any data for transmission during the configured grant occasion;
   selecting an uplink resource to transmit the no-data indication based on an order in a physical uplink shared channel (PUSCH) occasion that is sensed without energy; and
   transmitting the no-data indication to the base station, wherein the no-data indication is transmitted, using the selected uplink resource based on the order in the PUSCH occasion that is sensed without energy, over a PUSCH, and at least partially overlaps in one or both of time or frequency with a resource within a region of the configured grant occasion, wherein the no-data indication is a dummy null packet that prevents the base station from allocating additional resources to the UE for retransmission.

2. The method of claim 1, wherein the configured grant occasion includes a first time period for the UE to transmit the no-data indication and a second time period for transmitting data over the PUSCH when the UE has data to transmit.

3. The method of claim 1, wherein the no-data indication is transmitted using less than all available resource elements in an orthogonal frequency division multiplexing (OFDM) symbol.

4. The method of claim 1, wherein transmitting the no-data indication to the base station further comprises:
   selecting an uplink resource from a plurality of available resources allocated to multiple UEs; and
   transmitting the no-data indication using the selected uplink resource.

5. The method of claim 1, wherein transmitting the no-data indication to the base station further comprises:
   aligning a timing of the transmission of the no-data indication to the base station in a first cell with the timing of uplink communication in at least one second cell.

6. The method of claim 1, wherein the no-data indication is configured to prevent allocation of one or more additional resources to the UE by the base station.

7. The method of claim 1, wherein the no-data indication comprises, at least in part, a buffer status report (BSR), a power headroom report (PHR), or both.

8. The method of claim 1, wherein the no-data indication is transmitting over the PUSCH as a medium access control (MAC) control element (CE).

9. The method of claim 1, further comprises, prior to transmitting the no-data indication to the base station, randomly selecting an uplink resource to transmit the no-data indication.

10. A user equipment (UE) comprising:
    a transceiver;
    a memory storing computer executable instructions; and
    a processor communicatively coupled with the memory and the transceiver, and configured to execute the instructions to:
      determine whether the UE has any data to transmit during a configured grant occasion allocated to the UE by a base station;
      generate a no-data indication based on a determination that the UE does not have any data for transmission during the configured grant occasion;
      select an uplink resource to transmit the no-data indication based on an order in a physical uplink shared channel (PUSCH) occasion that is sensed without energy; and
      transmit, via the transceiver, the no-data indication to the base station using the selected uplink resource, wherein the no-data indication is transmitted over a PUSCH, and at least partially overlaps in one or both of time or frequency with a resource within a region of the configured grant occasion, wherein the no-data indication is a dummy null packet that prevents the base station from allocating additional resources to the UE for retransmission.

11. The UE of claim 10, wherein the configured grant occasion includes a first time period for the UE to transmit the no-data indication and a second time period for transmitting data over the PUSCH when the UE has data to transmit.

12. The UE of claim 10, wherein the no-data indication is transmitted using less than all available resource elements in an orthogonal frequency division multiplexing (OFDM) symbol.

13. The UE of claim 10, wherein transmitting the no-data indication to the base station further comprises:
    selecting an uplink resource from a plurality of available resources allocated to multiple UEs; and
    transmitting the no-data indication using the selected uplink resource.

14. The UE of claim 10, wherein transmitting the no-data indication to the base station further comprises:
    align a timing of the transmission of the no-data indication to the base station in a first cell with the timing of uplink communication in at least one second cell.

15. The UE of claim 10, wherein the no-data indication is configured to prevent allocation of one or more additional resources to the UE by the base station.

16. The UE of claim 10, wherein the no-data indication comprises, at least in part, a buffer status report (BSR), a power headroom report (PHR), or both.

17. A non-transitory computer-readable medium storing computer executable instructions, comprising instructions for:

determining whether a user equipment (UE) has any data to transmit during a configured grant occasion allocated to the UE by a base station;

generating a no-data indication based on a determination that the UE does not have any data for transmission during the configured grant occasion;

selecting an uplink resource to transmit the no-data indication based on an order in a physical uplink shared channel (PUSCH) occasion that is sensed without energy; and transmitting the no-data indication to the base station using the selected uplink resource, wherein the no-data indication is transmitted over a PUSCH, and at least partially overlaps in one or both of time or frequency with a resource within a region of the configured grant occasion, wherein the no-data indication is a dummy null packet that prevents the base station from allocating additional resources to the UE for retransmission.

18. The non-transitory computer-readable medium of claim 17, wherein the configured grant occasion includes a first time period for the UE to transmit the no-data indication and a second time period for transmitting data over the PUSCH when the UE has data to transmit.

19. An apparatus for wireless communications, comprising:

means for determining whether a user equipment (UE) has any data to transmit during a configured grant occasion allocated to the UE by a base station;

means for generating a no-data indication based on a determination that the UE does not have any data for transmission during the configured grant occasion allocated to the UE;

means for selecting an uplink resource to transmit the no-data indication based on an order in a physical uplink shared channel (PUSCH) occasion that is sensed without energy; and means for transmitting the no-data indication to the base station using the selected uplink resource, wherein the no-data indication is transmitted over a PUSCH, and at least partially overlaps in one or both of time or frequency with a resource within a region of the configured grant occasion, wherein the no-data indication is a dummy null packet.

20. The apparatus of claim 19, wherein the configured grant occasion includes a first time period for the UE to transmit the no-data indication and a second time period for transmitting data over the PUSCH when the UE has data to transmit.

21. The apparatus of claim 19, wherein the no-data indication is transmitted using less than all available resource elements in an orthogonal frequency division multiplexing (OFDM) symbol.

22. The apparatus of claim 19, wherein the means for transmitting the no-data indication to the base station further comprises:

means for selecting an uplink resource from a plurality of available resources allocated to multiple UEs; and means for transmitting the no-data indication using the selected uplink resource.

23. The apparatus of claim 19, wherein the means for transmitting the no-data indication to the base station further comprises:

means for aligning a timing of the transmission of the no-data indication to the base station in a first cell with the timing of uplink communication in at least one second cell.

24. The apparatus of claim 19, wherein the no-data indication is configured to prevent allocation of one or more additional resources to the UE by the base station.

25. The apparatus of claim 19, wherein the no-data indication comprises, at least in part, a buffer status report (BSR), a power headroom report (PHR), or both.

* * * * *